United States Patent
Babuin et al.

(10) Patent No.: US 12,109,910 B2
(45) Date of Patent: Oct. 8, 2024

(54) CHARGE VISUAL DISPLAY FOR ELECTRIC VEHICLES

(71) Applicant: AUTOMOBILI PININFARINA GMBH, Munich (DE)

(72) Inventors: Roberto Babuin, Andezeno (IT); Davide Loris Amantea, Turin (IT)

(73) Assignee: AUTOMOBILI PININFARINA GMBH, Munich (DE)

( * ) Notice: Subject to any disclaimer, the term of this patent is extended or adjusted under 35 U.S.C. 154(b) by 258 days.

(21) Appl. No.: 17/904,168

(22) PCT Filed: Feb. 16, 2021

(86) PCT No.: PCT/IB2021/051290
§ 371 (c)(1),
(2) Date: Aug. 12, 2022

(87) PCT Pub. No.: WO2021/165825
PCT Pub. Date: Aug. 26, 2021

(65) Prior Publication Data
US 2023/0091172 A1    Mar. 23, 2023

(30) Foreign Application Priority Data
Feb. 19, 2020    (IT) .................. 102020000003395

(51) Int. Cl.
*B60L 58/12*    (2019.01)

(52) U.S. Cl.
CPC ........... *B60L 58/12* (2019.02); *B60L 2250/16* (2013.01)

(58) Field of Classification Search
CPC ....... B60L 58/12; B60L 2250/16; Y02T 10/70
See application file for complete search history.

(56) References Cited

U.S. PATENT DOCUMENTS

| | | | |
|---|---|---|---|
| 2014/0088804 A1* | 3/2014 | Hyde | B60L 53/12 |
| | | | 701/22 |
| 2017/0267117 A1 | 9/2017 | Grider et al. | |
| 2018/0015829 A1* | 1/2018 | Braun | B60K 35/10 |
| 2018/0334052 A1 | 11/2018 | Hwang et al. | |
| 2020/0156498 A1* | 5/2020 | Jun | B60L 58/12 |

FOREIGN PATENT DOCUMENTS

| | | |
|---|---|---|
| CN | 108128174 A | 6/2018 |
| DE | 102012004742 A1 | 9/2013 |
| EP | 3185391 A1 | 6/2017 |
| GB | 2550480 A | 11/2017 |
| WO | 2009035531 A2 | 3/2009 |

OTHER PUBLICATIONS

International Search Report and Written Opinion of International Application No. PCT/IB2021/051290, mailed May 28, 2021, 13 pages.

* cited by examiner

*Primary Examiner* — Behrang Badii
(74) *Attorney, Agent, or Firm* — Heslin Rothenberg Farley & Mesiti P.C.; Victor A. Cardona, Esq.

(57) ABSTRACT

A charge visual display for electric vehicles, of including a plate-like body configured to be fixed to a lower central area area of a rear window of a motor vehicle and bearing—on an exposed surface thereof—a central luminous indicator, a first annular luminous indicator surrounding the central luminous indicator and a second annular luminous indicator concentrically surrounding the first annular luminous indicator.

5 Claims, 3 Drawing Sheets

CHARGE VISUAL DISPLAY FOR ELECTRIC VEHICLES

CROSS REFERENCE TO RELATED APPLICATIONS

This application is a national stage filing under Section 371 of International Application No. PCT/IB2021/051290, filed Feb. 16, 2021, published in English on Aug. 26, 2021, as WO 2021/165825 and which claims priority from Italian Patent Application No. 102020000003395 filed on Feb. 19, 2020, the entire disclosures of which are incorporated herein by reference.

FIELD OF THE INVENTION

The present invention generally relates to electric vehicles, and more particularly it relates to a visual display indicating battery charge when the vehicle is connected to an external electric power supply source.

STATE OF THE PRIOR ART

Document US 2017/267117A1 discloses a charge visual display for electric vehicles consisting of a closing cap pivoted to a side socket of the vehicle arranged for the insertion of the battery charge connector. The cap is provided with two luminous indicators: an internal luminous indicator visible only when the cap is open, and an external luminous indicator visible both when the cap is closed and when it is open. Both are barely visible and simply indicate the state of charge of the battery, i.e. they only provide static information so to say, but they do not dynamically display the progress of the charging cycle thereof when the charging connector is inserted into the socket of the vehicle.

SUMMARY OF THE INVENTION

The object of the present invention is to provide a particularly practical and functional charge visual display, which can be clearly identified and always visible from the external so as to be able to provide the observer with immediate and complete information not only on the state of charge of the batteries but also of the progression of the charging cycle.

A further object of the invention is to provide a charge visual display which, besides displaying the state and the charging cycle, also serves as a useful so-called welcome/goodbye function when the user of the vehicle actuates the remote control to open/close the doors.

According to the invention, these and other objects are achieved thanks to a charge visual display for electric vehicles, characterised in that it consists of a plate-like body configured to be fixed to the lower central area of the rear window (R) of a motor vehicle (M) with the front surface thereof exposed bearing:
 a central luminous indicator,
 a first annular luminous indicator surrounding the central luminous indicator, and
 a second annular luminous indicator concentrically surrounding the first annular luminous indicator,
 the arrangement being operatively configured in a manner such that, starting from an inoperative condition in which all the luminous indicators are OFF, the activation of the charge visual display provides for the following sequence:
 flashing or fixed lighting of the central luminous indicator,
 at the start of the charging cycle, full fixed lighting of the first annular luminous indicator and partial lighting of the second annular luminous indicator in a minimum lighting configuration,
 during the charging cycle, progressive fixed lighting up of the second annular luminous indicator from said minimum lighting configuration towards a maximum lighting configuration,
 upon completion of the charging cycle, full fixed lighting of the second annular luminous indicator.

Thanks to this solution idea, the charge visual display according to the invention allows to provide a clearly visible, immediate and complete information on the progression of the charging cycle of the vehicle batteries, from the beginning to the end.

According to a preferred embodiment of the invention, the first and the second annular luminous indicator have a thin generally quadrangular-shaped profile.

BRIEF DESCRIPTION OF THE DRAWINGS

The invention will now be described in detail, purely by way of non-limiting example, with reference to the attached drawings, wherein.

DETAILED DESCRIPTION OF THE INVENTION

Figure 5:
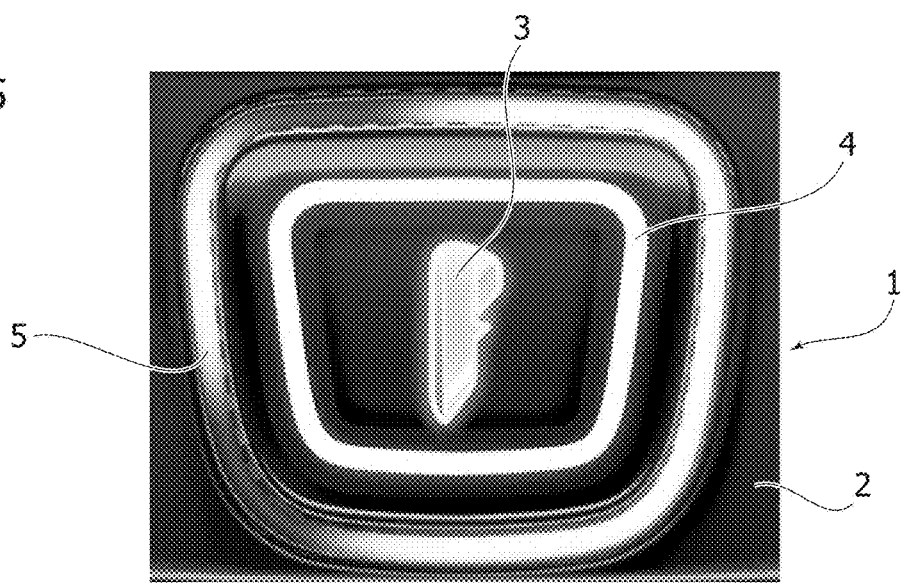
Figure 6:
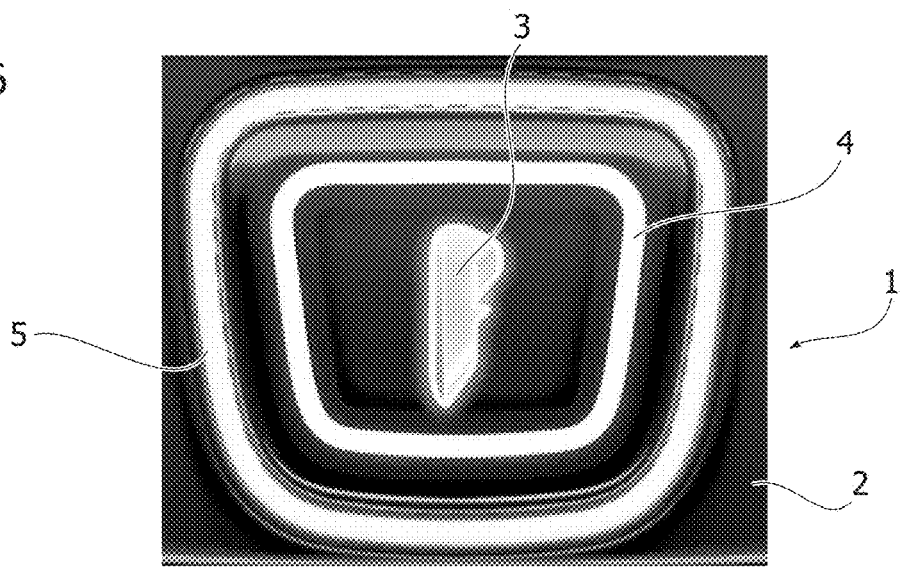
FIG. 6 is a view similar to FIGS. 1-5 showing the visual display in the charging cycle completed condition.
Figure 7:
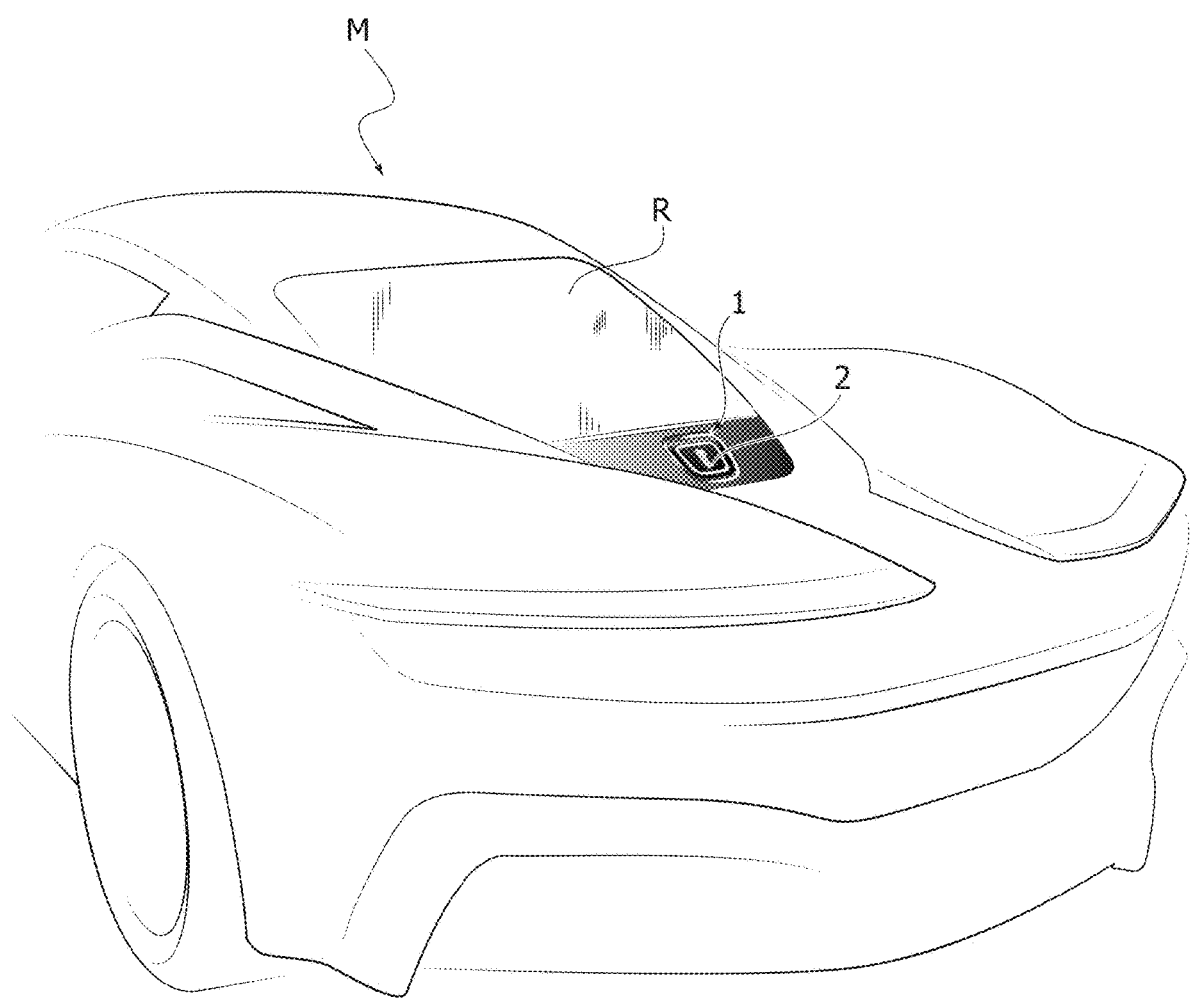
FIG. 7 is a schematic perspective view showing the distinctive positioning of the charge visual display according to the invention on board an electric or hybrid car.

With reference to FIGS. 1-6, the charge visual display according to the invention essentially comprises a plate-like body 1 expressly configured to be fixed to the external of an electric or hybrid vehicle, specifically—as represented in FIG. 7—in the lower central area of the rear window R of the motor vehicle M, with the front surface 2 thereof exposed and thus clearly visible and immediately identifiable from the external.

On such exposed surface 2 the visual display according to the invention has a central luminous indicator 3, a first annular luminous indicator 4 surrounding the central luminous indicator 3, and a second annular luminous indicator 5 concentrically surrounding the first annular luminous indicator 4.

In the case of the illustrated example, the first and second annular luminous indicator 4, 5 have a thin generally quadrangular-shaped profile, for example in the form of a right-angled trapezium with rounded corners. Obviously, this shape is provided purely by way of non-limiting example.

The charge visual display according to the invention is provided with an electronic control unit, not illustrated given that it is within the reach of a man skilled in the art, for example fixed to the dorsal surface thereof and operatively connected to the circuit for charging the batteries of the electric vehicle through an external cable which can be connected to a power-supply source. The charge visual display according to the invention is thus operatively configured so as to provide an efficient and complete lighting display, which can be immediately identified from the external of the vehicle, of the progression of the charging cycle, from the beginning to the end.

The charge visual display according to the invention operates as follows.

Figure 1:
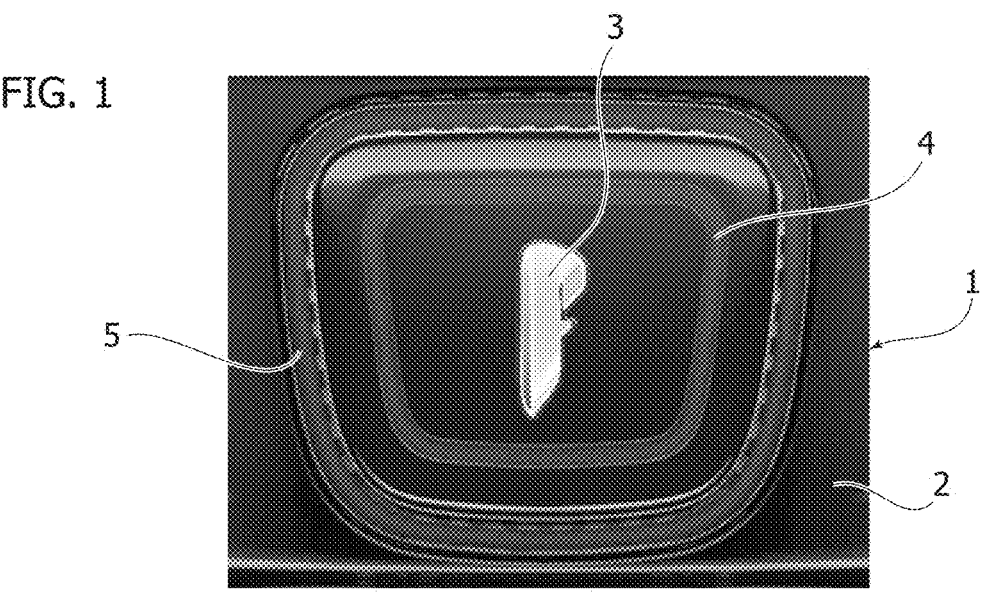
FIG. 1 is a front schematic view of the charge visual display according to the invention, represented in an inoperative condition.
Figure 2:
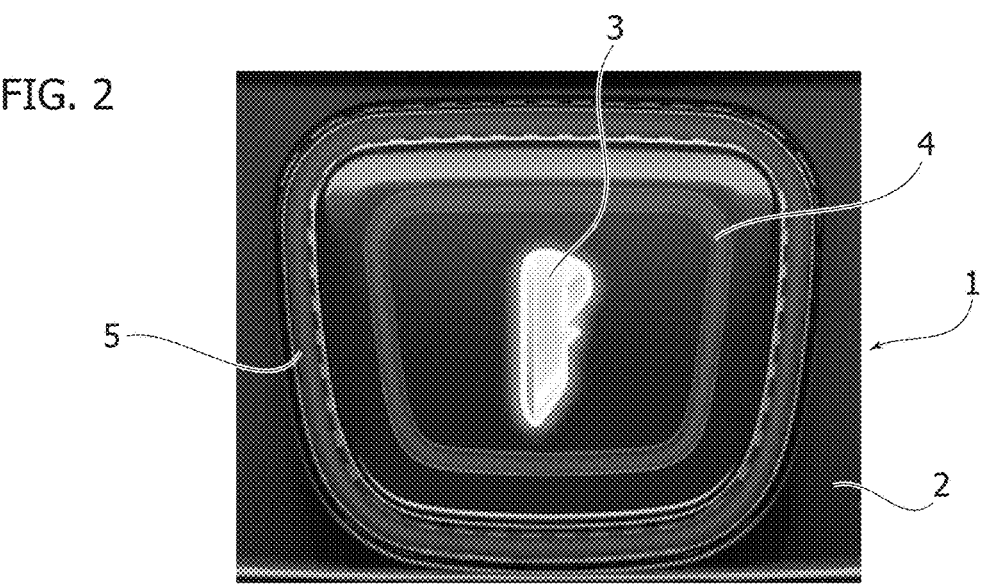
FIGS. 2, 3, 4 and 5 are views similar to FIG. 1 representing the operating progression of the visual display during a charging cycle.

Starting from an inoperative condition represented in FIG. 1, in which the vehicle is not connected to the external power-supply source and all the luminous indicators 3, 4 and 5 are OFF, the central luminous indicator 3 is initially actuated (FIG. 2), for example in a fixed or flashing fashion. This configuration typically corresponds to the actuation of the remote control to disarm the anti-theft system and unlock the doors by the user ("welcome" function). The central luminous indicator 3 will turn OFF once the remote control is actuated to re-arm the anti-theft system and lock the doors ("goodbye" function).

Figure 3:
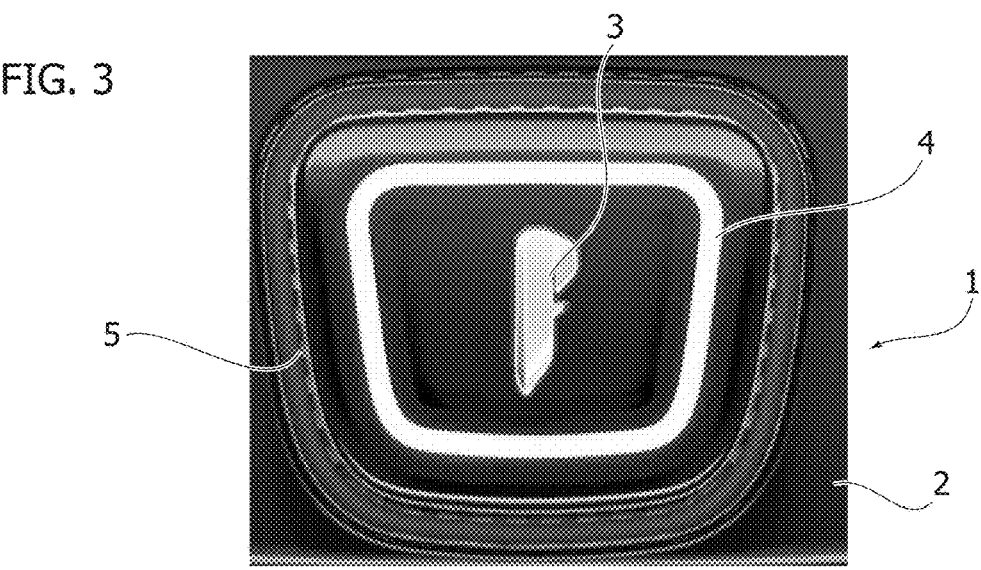
Figure 4:
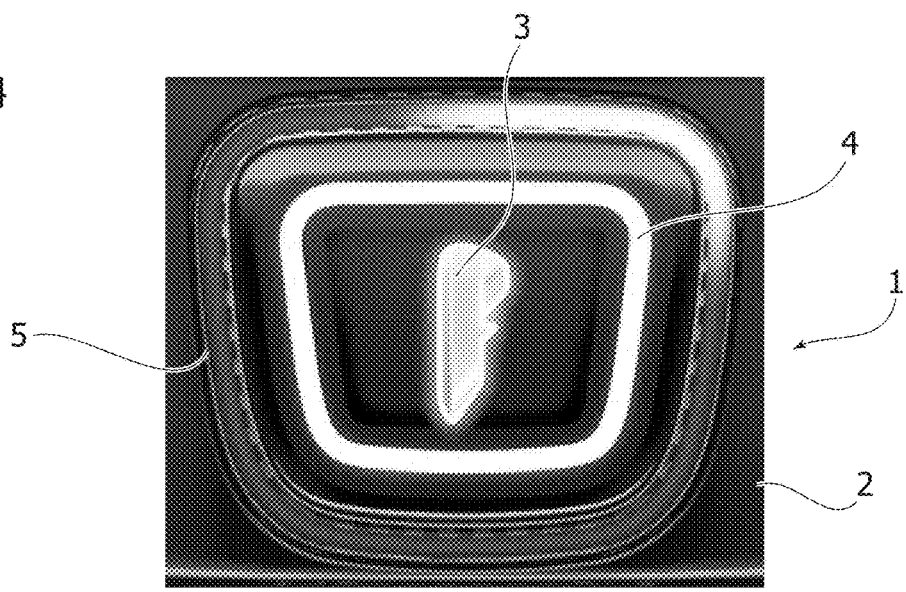

When the vehicle is connected to the external source for starting the charging cycle of the batteries thereof, the first annular luminous indicator 4 is completely switched ON in a fixed fashion, while the central luminous indicator 3 continues to flash (FIG. 3).

At the same time, or immediately after the start of the charging cycle, the second annular luminous indicator 5 starts to light up first in a minimum lighting configuration (FIG. 4), gradually increasing the amount the lighting intensity thereof (FIG. 5). In this step the progressive increase of the lighting portion of the second luminous indicator 5 can be, so to speak, static, or in successive incremental steps, or dynamic by means of the circulation of the light along the perimeter thereof (FIG. 5).

Upon completion of the charging cycle, the second annular luminous indicator 5 is completely and fixedly lit, while the first annular luminous indicator also remains fixedly lit and the central luminous indicator 3 continues to flash (FIG. 6).

When the charging cable is disconnected from the external power source, the visual display according to the invention resumes the inoperative configuration of FIG. 1.

Obviously, the construction details and the embodiments of the invention may widely vary with respect to what has been described and illustrated, without departing from the scope of protection of the present invention as defined in the claims that follow.

The invention claimed is:

1. Charge visual display for electric vehicles, comprising a plate-like body configured to be secured at a lower central area of a rear window of a motor vehicle with a front surface thereof exposed bearing:

a central luminous indicator, a first annular luminous indicator surrounding the central luminous indicator, a second annular luminous indicator concentrically surrounding the first annular luminous indicator, the arrangement being operatively configured in a manner such that, starting from an inoperative condition in which all the luminous indicators are switched off, activation of the charge visual display provides for the following sequence:

flashing or fixed lighting of the central luminous indicator, at the start of a charging cycle, full fixed lighting of the first annular luminous indicator and partial lighting of the second annular luminous indicator in a minimum lighting configuration, during the charging cycle, progressive lighting up of the second annular luminous indicator from said minimum lighting configuration towards a maximum lighting configuration, upon completion of the charging cycle, full fixed lighting of the second annular luminous indicator.

2. Charge visual display according to claim 1, wherein the progressive lighting up of the second annular luminous indicator is carried out in incremental static steps.

3. Charge visual display according to claim 1, wherein the progressive lighting up of the second annular luminous indicator is carried out in a dynamic fashion.

4. Charge visual display according to claim 1 wherein the first annular luminous indicator and the second annular luminous indicator have a thin generally quadrangular-shaped profile.

5. Hybrid or electric motor vehicle (M) comprising a charge visual display according to claim 1 fixed to the lower central area of the rear window thereof.

* * * * *